US012194893B2

(12) United States Patent
Omori et al.

(10) Patent No.: US 12,194,893 B2
(45) Date of Patent: Jan. 14, 2025

(54) OPERATION DEVICE

(71) Applicant: TOYO DENSO KABUSHIKI KAISHA, Tokyo (JP)

(72) Inventors: Yasushi Omori, Saitama (JP); Yusuke Nogata, Saitama (JP)

(73) Assignee: TOYO DENSO KABUSHIKI KAISHA, Tokyo (JP)

(*) Notice: Subject to any disclaimer, the term of this patent is extended or adjusted under 35 U.S.C. 154(b) by 283 days.

(21) Appl. No.: 17/865,915

(22) Filed: Jul. 15, 2022

(65) Prior Publication Data

US 2023/0035738 A1 Feb. 2, 2023

(30) Foreign Application Priority Data

Jul. 29, 2021 (JP) ................. 2021-124519

(51) Int. Cl.
*B60N 2/02* (2006.01)
*B60N 2/75* (2018.01)
*G06F 3/04847* (2022.01)
*G06F 3/0488* (2022.01)

(52) U.S. Cl.
CPC ......... *B60N 2/0228* (2013.01); *B60N 2/0239* (2023.08); *B60N 2/797* (2018.02); *G06F 3/04847* (2013.01); *G06F 3/0488* (2013.01); *B60N 2/0229* (2023.08)

(58) Field of Classification Search
CPC ... B60N 2/0228; B60N 2/797; G06F 3/04847; G06F 3/0488; G06F 2203/04809; G06F 3/03547; G06F 3/04883; B60K 2360/111; B60K 2360/119; B60K 2360/1442; B60K 35/10
See application file for complete search history.

(56) References Cited

U.S. PATENT DOCUMENTS

| | | | |
|---|---|---|---|
| 2014/0225855 A1* | 8/2014 | Aitchison | ............... G06F 3/041 345/173 |
| 2017/0192457 A1* | 7/2017 | Holme | ................. G06F 1/1626 |
| 2019/0106019 A1* | 4/2019 | Rose | .................... B60N 2/0268 |

FOREIGN PATENT DOCUMENTS

JP 2015-017360 A 1/2015

* cited by examiner

*Primary Examiner* — Alan D Hutchinson
(74) *Attorney, Agent, or Firm* — IP Business Solutions, LLC

(57) ABSTRACT

An operation device according to the present invention includes a touch-sensitive operation surface placed in a vehicle and a detecting unit configured to detect touch operation by an operator on the touch-sensitive operation surface. On the touch-sensitive operation surface, a guide part having a convex shape or a concave shape and a planar operation part to be an operation location having a planar shape located around the guide part are formed. The detecting unit is configured to detect slide operation on the guide part from the planar operation part, and accept later operation on a predetermined operation location as an operation instruction set in accordance with a status of the slide operation on the guide part.

6 Claims, 14 Drawing Sheets

Fig.4
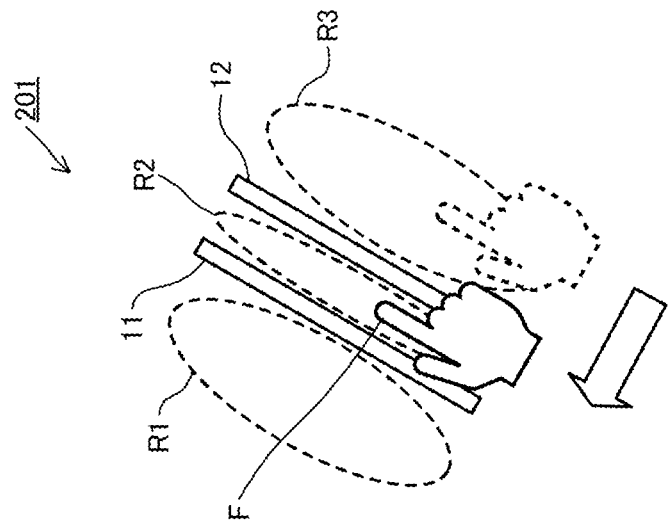
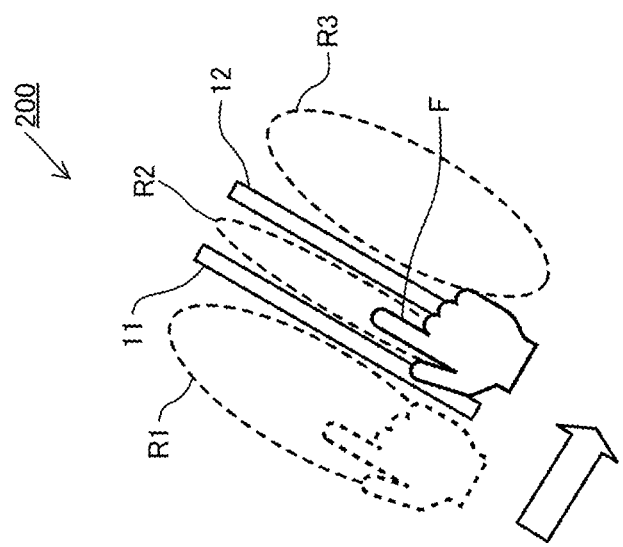

Fig.13
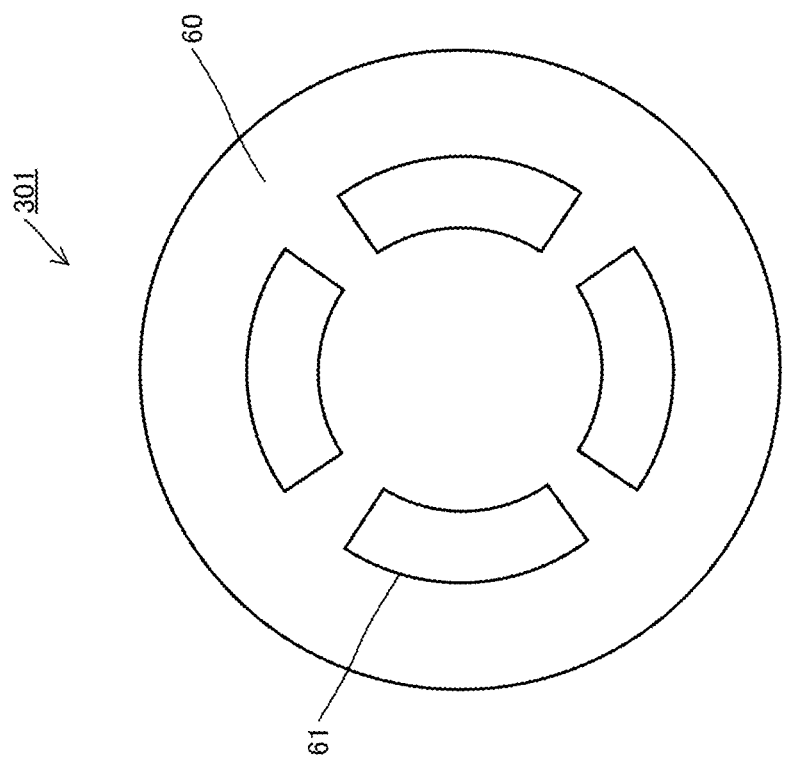
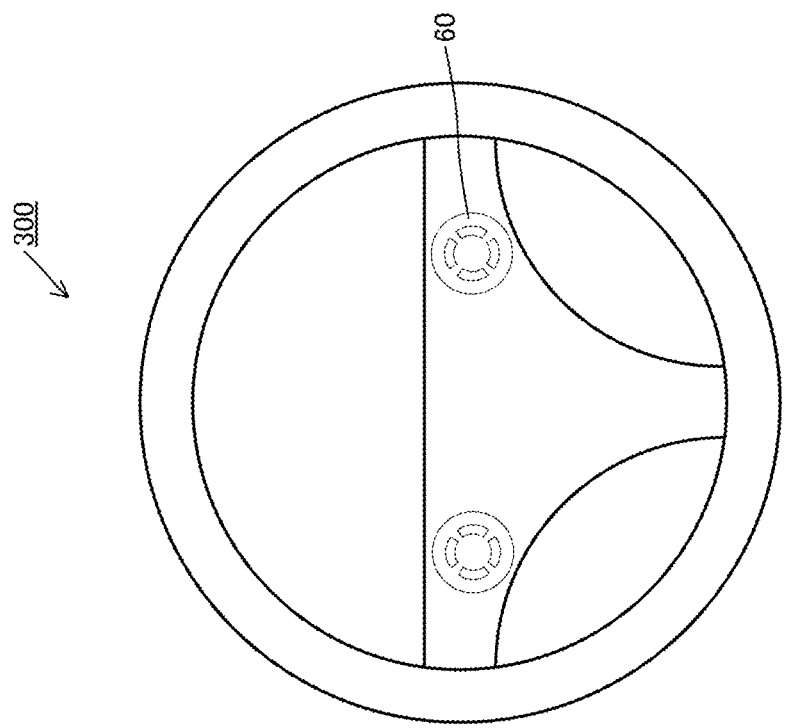

OPERATION DEVICE

INCORPORATION BY REFERENCE

This application is based upon and claims the benefit of priority from Japanese patent application No. 2021-124519, filed on Jul. 29, 2021, the disclosure of which is incorporated herein in its entirety by reference.

TECHNICAL FIELD

The present invention relates to a touch-sensitive operation device mounted in a vehicle.

BACKGROUND ART

As an operation device to operate a component mounted in a vehicle, a touch-sensitive operation device is disclosed in Patent Document 1. The operation device disclosed in Patent Document 1 is placed on a driver's seat door and is configured to allow operation to open and close a driver's seat window. Specifically, the operation device disclosed in Patent Document 1 has a planar-shape touch panel and is configured to allow operation to open and close a window when an operator operates by moving his/her fingertip back and forth on the touch panel.

Patent Document 1: Japanese Unexamined Patent Application Publication No. JP-A 2015-017360

However, the above operation device allows the operator to perform movement operation only in a preset operation direction on the planar-shape touch screen, which makes it difficult to perform various kinds of operations for the component. Moreover, the operation device mounted in the vehicle needs operation without looking when the driver is the operator, and it is difficult by the operation without looking to perform an accurate and complicated touch operation for the touch screen. As a result, the touch-sensitive operation device as disclosed in Patent Document 1 has a problem that the operability for the component of the vehicle cannot be further increased.

SUMMARY OF THE INVENTION

Accordingly, an object of the present invention is to solve the abovementioned problem that the operability of a touch-sensitive operation device to operate a component mounted in a vehicle cannot be further increased.

An operation device as an aspect of the present invention is an operation device including a touch-sensitive operation surface placed in a vehicle and a detecting unit configured to detect touch operation by an operator on the touch-sensitive operation surface. On the touch-sensitive operation surface, a guide part having a convex shape or a concave shape and a planar operation part to be an operation location having a planar shape located around the guide part are formed. The detecting unit is configured to detect slide operation on the guide part from the planar operation part, and accept later operation on a predetermined operation location as an operation instruction set in accordance with a status of the slide operation on the guide part.

Further, an operation accepting method as an aspect of the present invention is an operation accepting method by an operation device including a touch-sensitive operation surface placed in a vehicle and a detecting unit configured to detect touch operation by an operator on the touch-sensitive operation surface. On the touch-sensitive operation surface, a guide part having a convex shape or a concave shape and a planar operation part to be an operation location having a planar shape located around the guide part are formed. The operation accepting method includes, by the detecting unit, detecting slide operation on the guide part from the planar operation part, and accepting later operation on a predetermined operation location as an operation instruction set in accordance with a status of the slide operation on the guide part.

With the configurations as described above, the present invention can further increase the operability of a touch-sensitive operation device to operate a component mounted in a vehicle.

BRIEF DESCRIPTION OF DRAWINGS

Reference numeral 100 of FIG. 1 denotes a view showing a configuration of an operation device in a first example embodiment of the present invention, reference numeral 101 of FIG. 1 denotes a cross-sectional view taken along line X-X of the operation device disclosed in reference numeral 100 of FIG. 1, and reference numeral 102 of FIG. 1 denotes a cross-sectional view taken along line X-X in another configuration example of the operation device disclosed in reference numeral 100 of FIG. 1.

Reference numeral 110 of FIG. 2 denotes a view showing an operation region set on the operation device disclosed in FIG. 1, and reference numeral 111 of FIG. 2 denotes a view showing the operation region in a cross-sectional view of the operation device disclosed in reference numeral 110 of FIG. 2.

Figure 1:
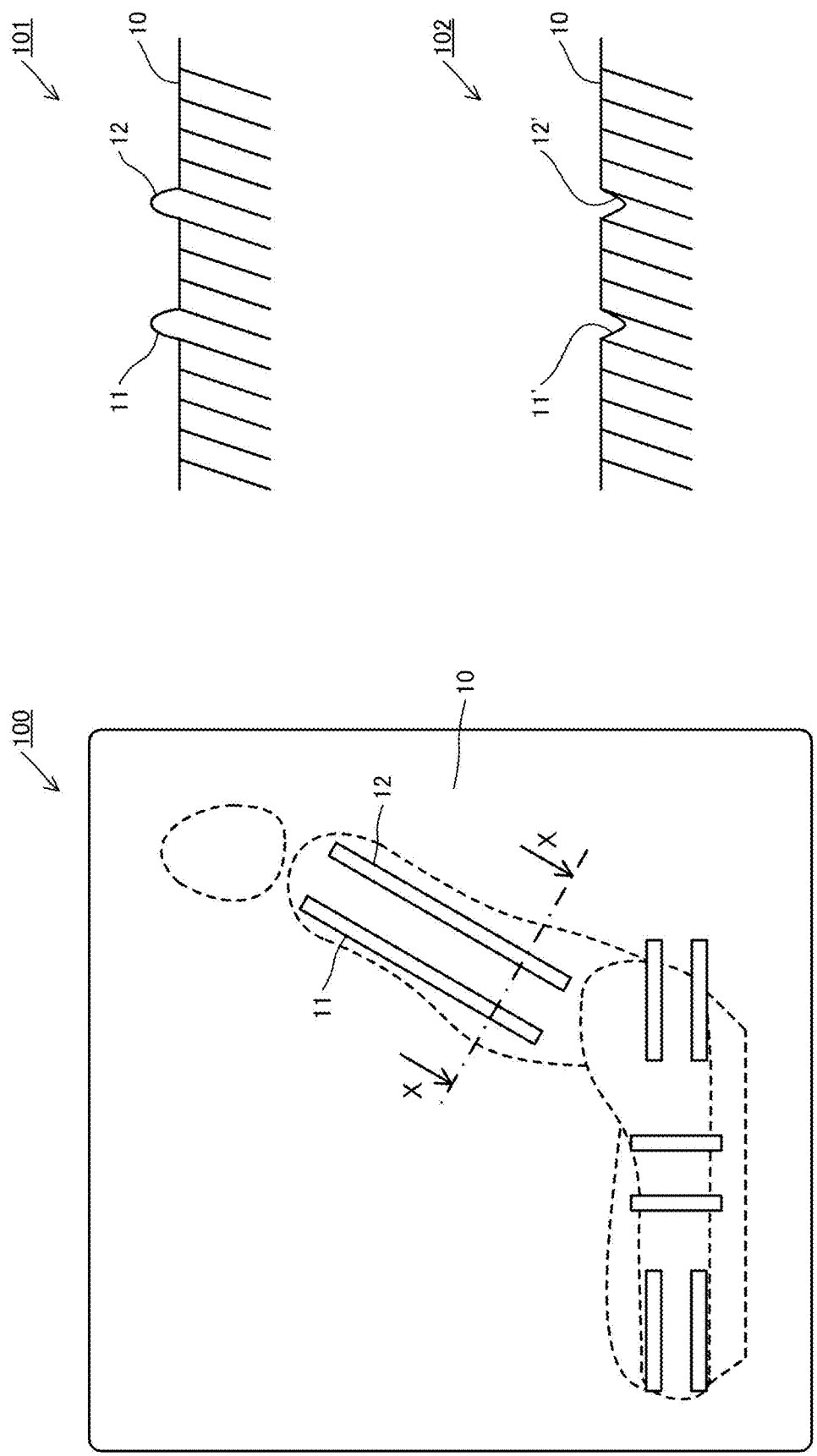
Figure 2:
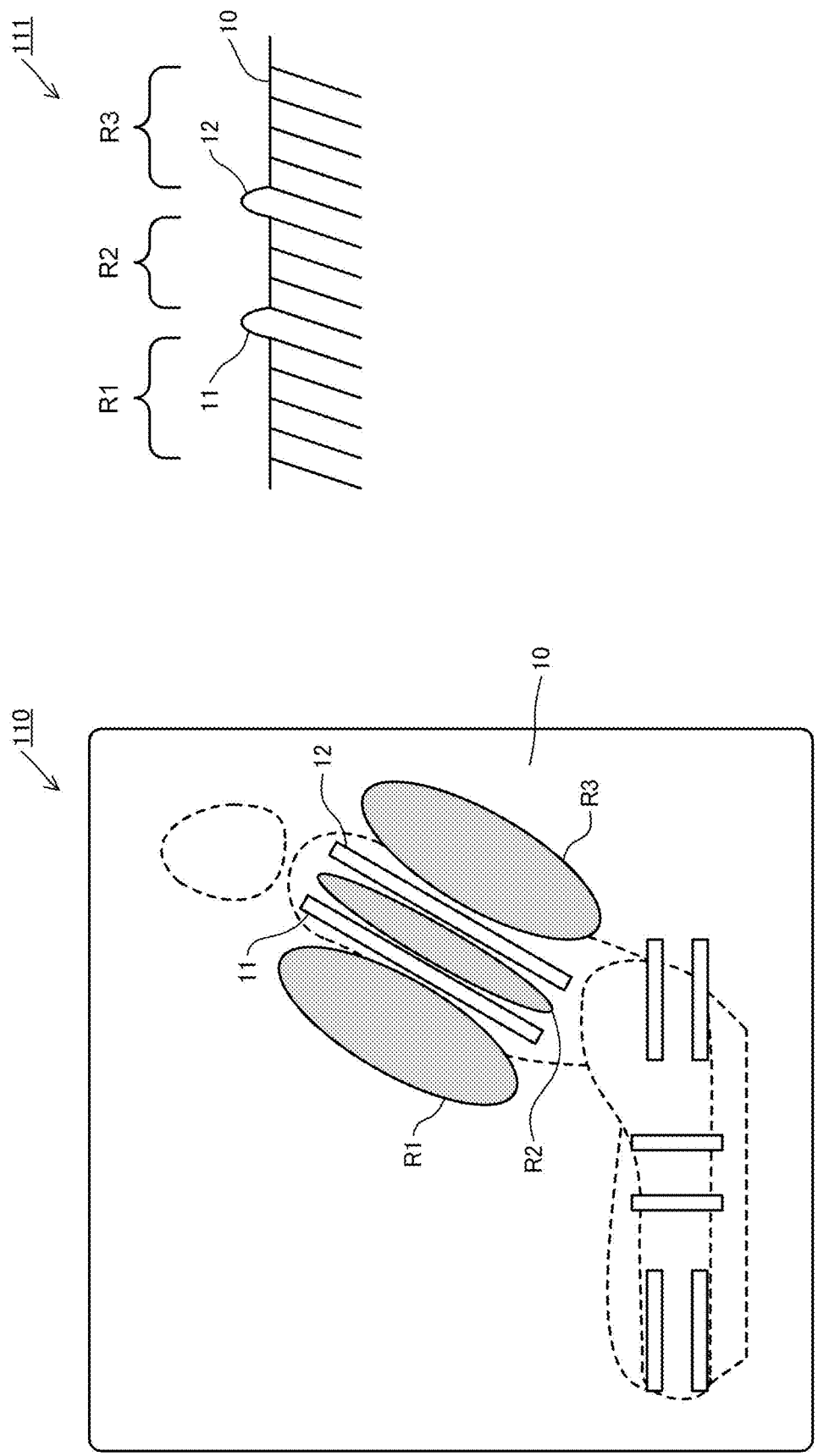
Figure 5:
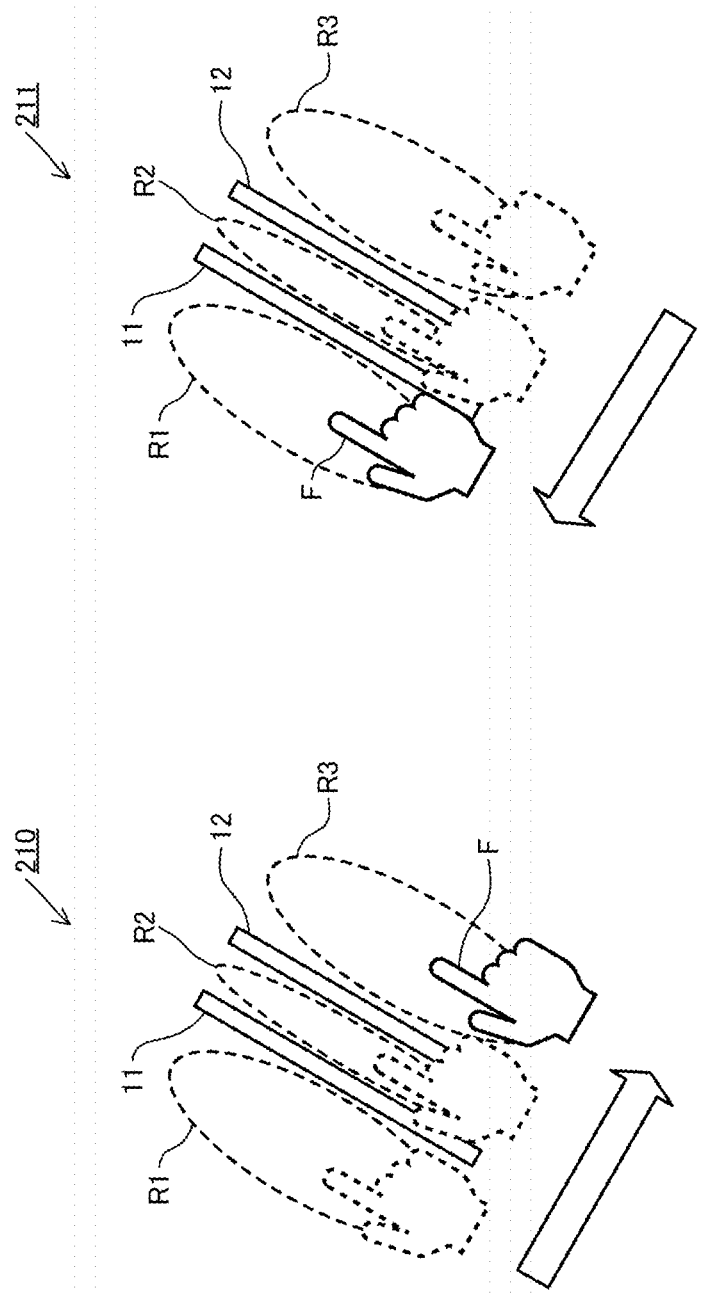
Figure 6:
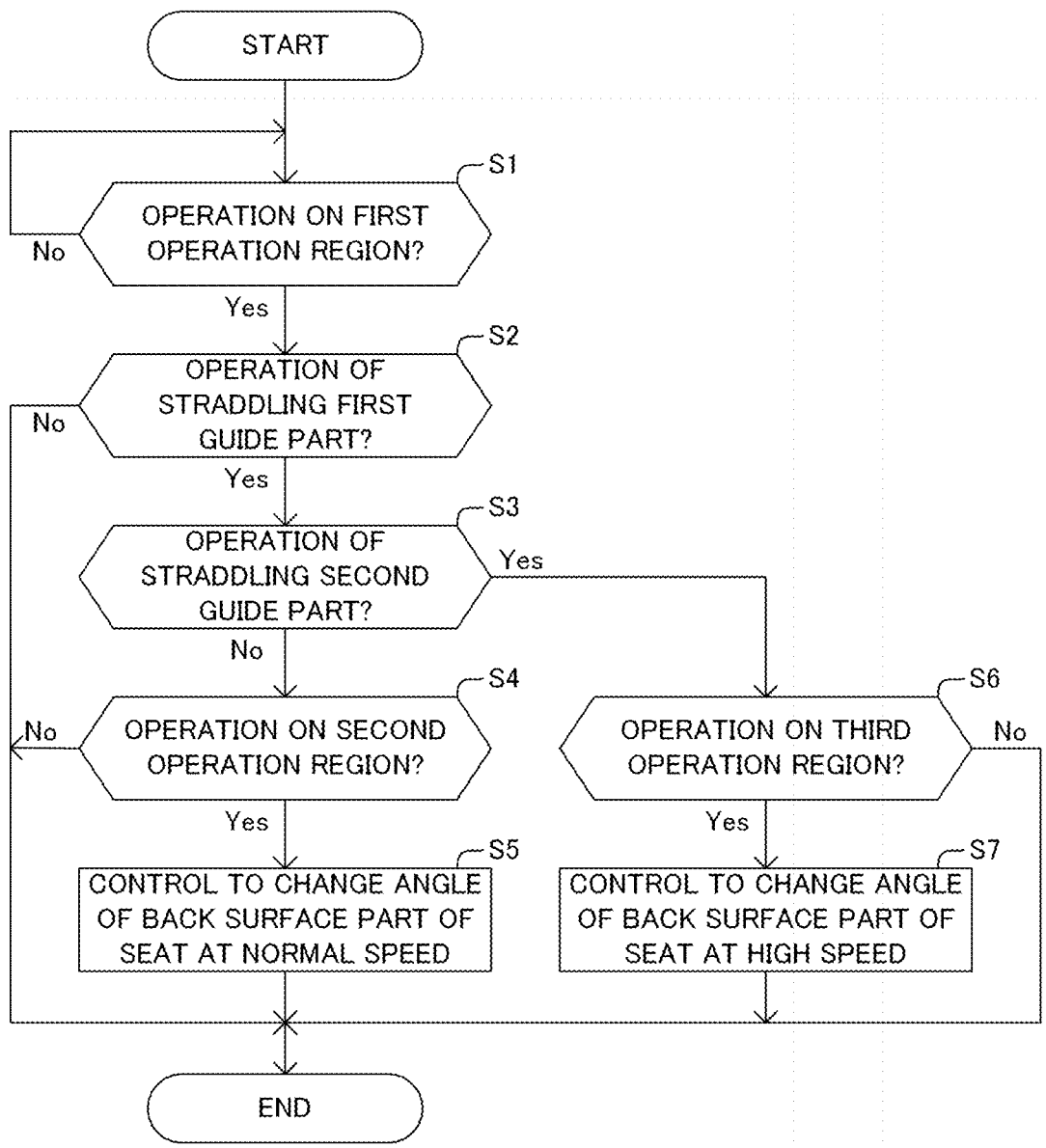
Figure 7:
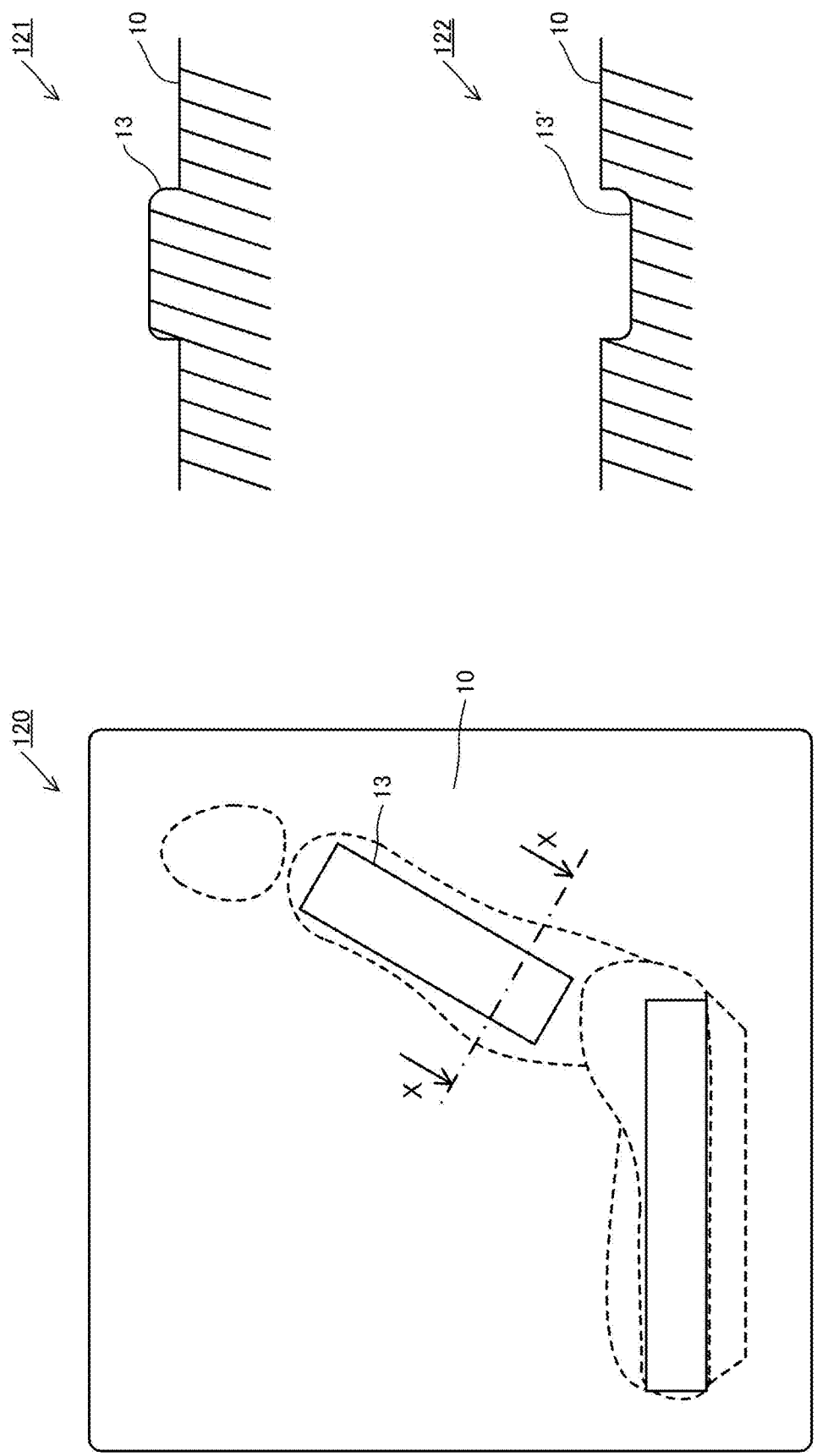
Figure 8:
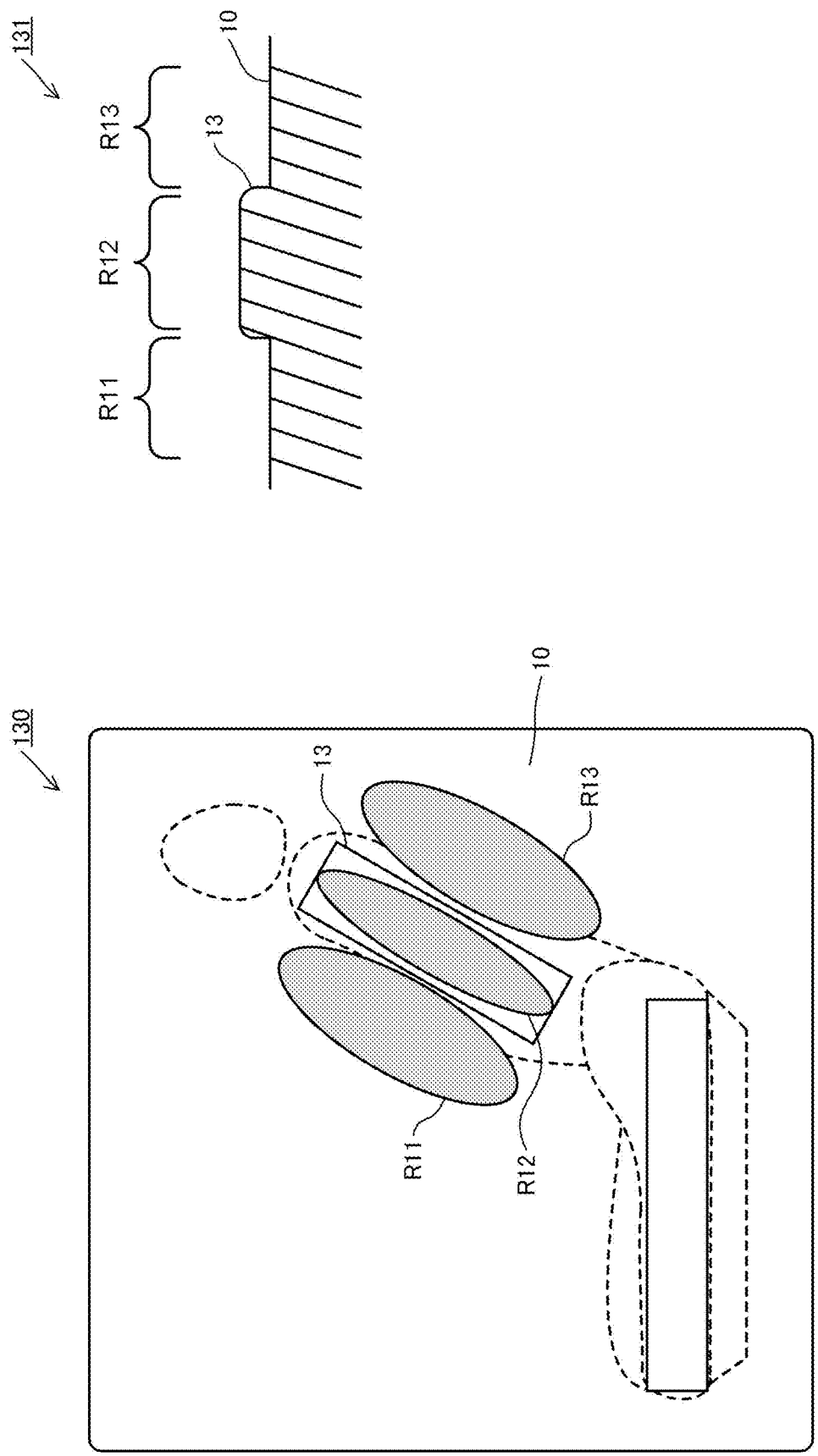
Figure 9:
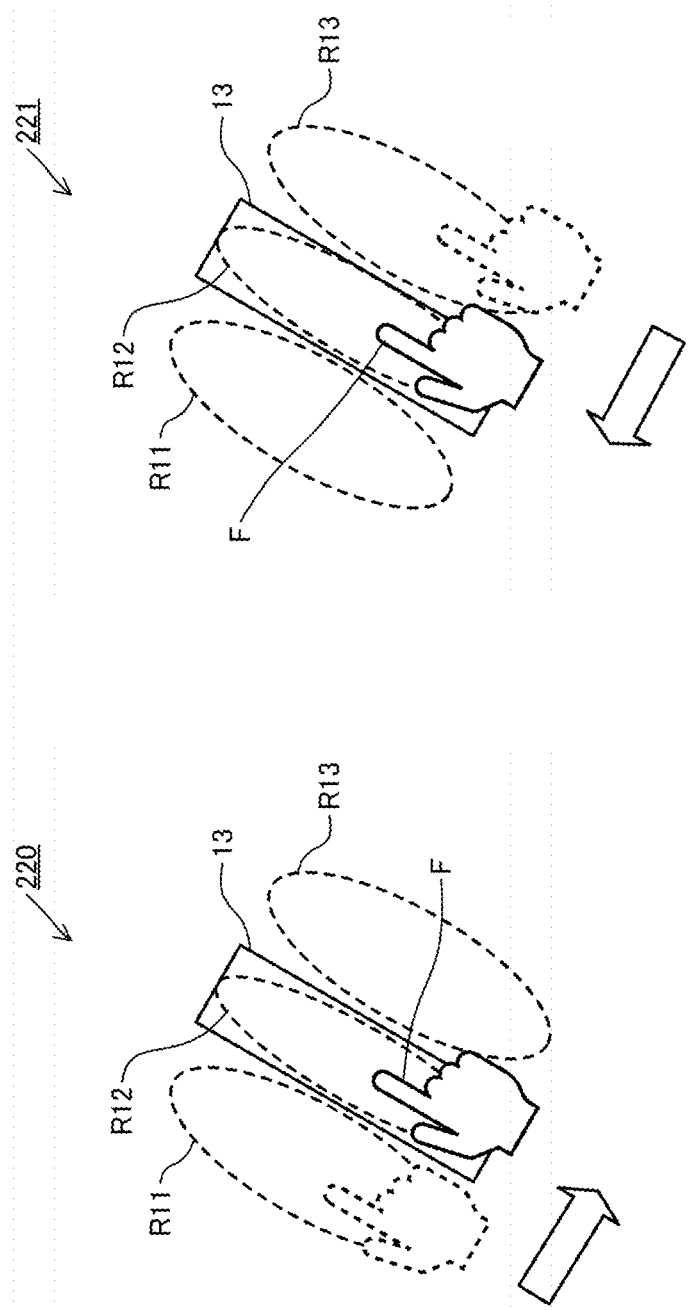
Figure 10:
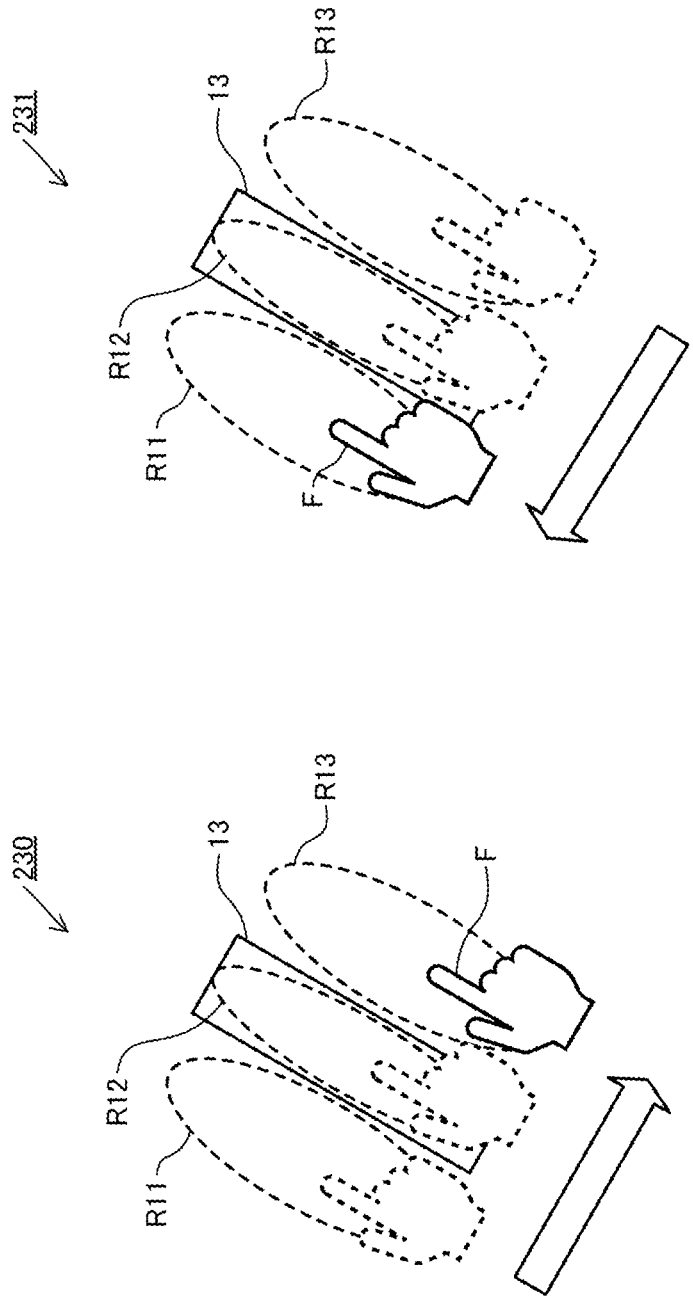
Figure 11:
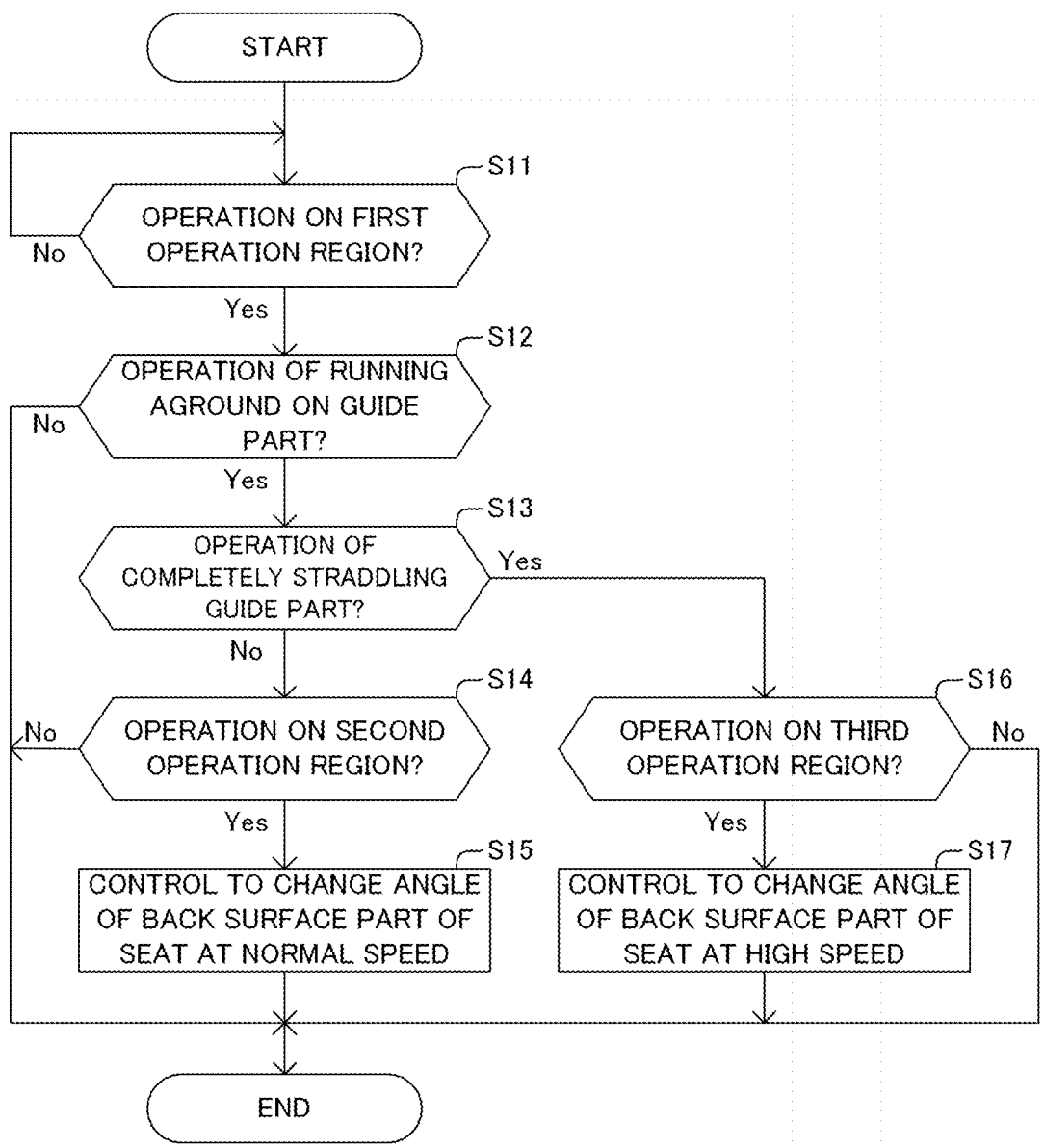
Figure 12:
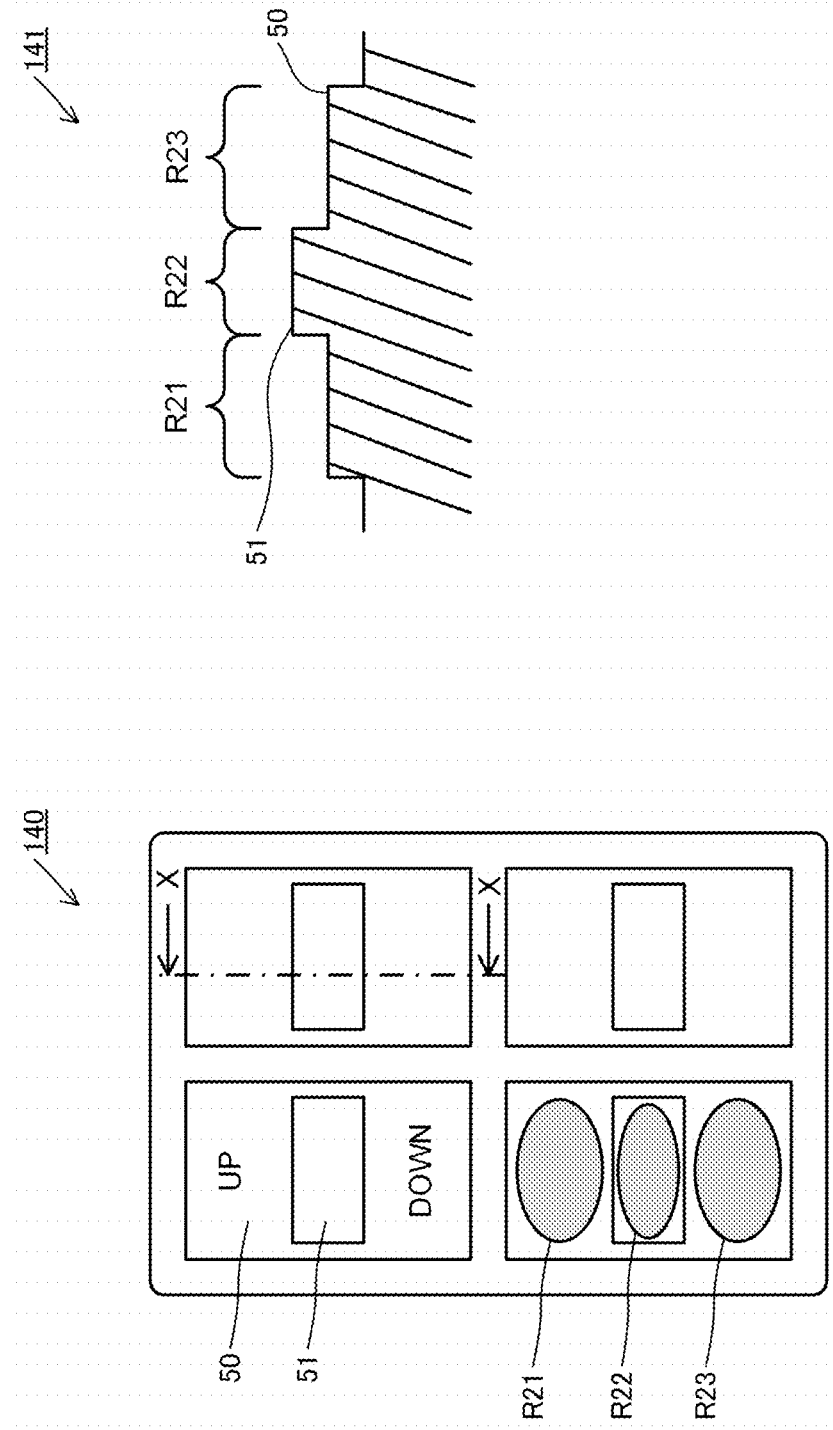
Figure 14:
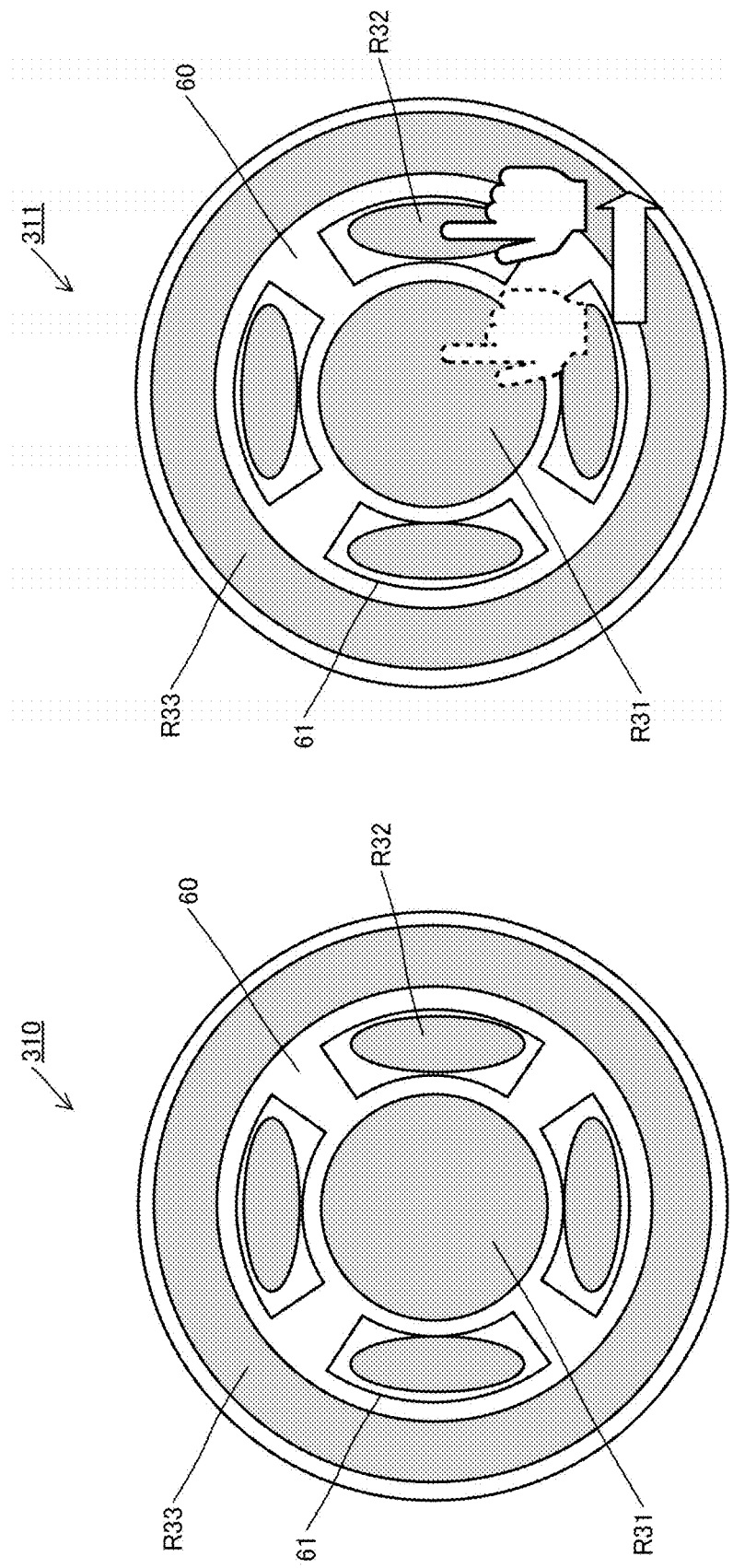

Reference numerals 200 and 201 of FIG. 4 denote views showing how to operate the operation device disclosed in FIG. 1;

Reference numerals 210 and 211 of FIG. 5 denote views showing how to operate the operation device disclosed in FIG. 1;

FIG. 6 shows a flowchart showing a method of operation of the operation device disclosed in FIG. 1;

Reference numeral 120 of FIG. 7 denotes a view showing a configuration of an operation device in a second example embodiment of the present invention, reference numeral 121 of FIG. 7 denotes a cross-sectional view taken along line X-X of the operation device disclosed in reference numeral 120 of FIG. 7, and reference numeral 122 of FIG. 7 denotes a cross-sectional view taken along line X-X in another configuration example of the operation device disclosed in reference numeral 120 of FIG. 7;

Reference numeral 130 of FIG. 8 denotes a view showing an operation region set on the operation device disclosed in FIG. 7, and reference numeral 131 of FIG. 8 denotes a view showing the operation region in a cross-sectional view of the operation device disclosed in reference numeral 130 of FIG. 2;

Reference numerals 220 and 221 of FIG. 9 denote views showing how to operate the operation device disclosed in FIG. 7;

Reference numerals 230 and 231 of FIG. 10 denote views showing how to operate the operation device disclosed in FIG. 7;

FIG. 11 shows a flowchart showing a method of operation of the operation device disclosed in FIG. 7;

Reference numeral 140 of FIG. 12 denotes a view showing a configuration of an operation device and an operation region in a third example embodiment of the present invention, and reference numeral 141 of FIG. 12 denotes a cross-sectional view taken along line X-X of the operation device disclosed in reference numeral 140 of FIG. 12;

Reference numerals 300 and 301 of FIG. 13 denote views showing a configuration of an operation device in a fourth example embodiment of the present invention; and Reference numeral 310 of FIG. 14 denotes an operation region set on the operation device disclosed in FIG. 13, and reference numeral 311 of FIG. 14 denotes a view showing how to operate the operation device disclosed in FIG. 13.

EXAMPLE EMBODIMENT

First Example Embodiment

Figure 3:
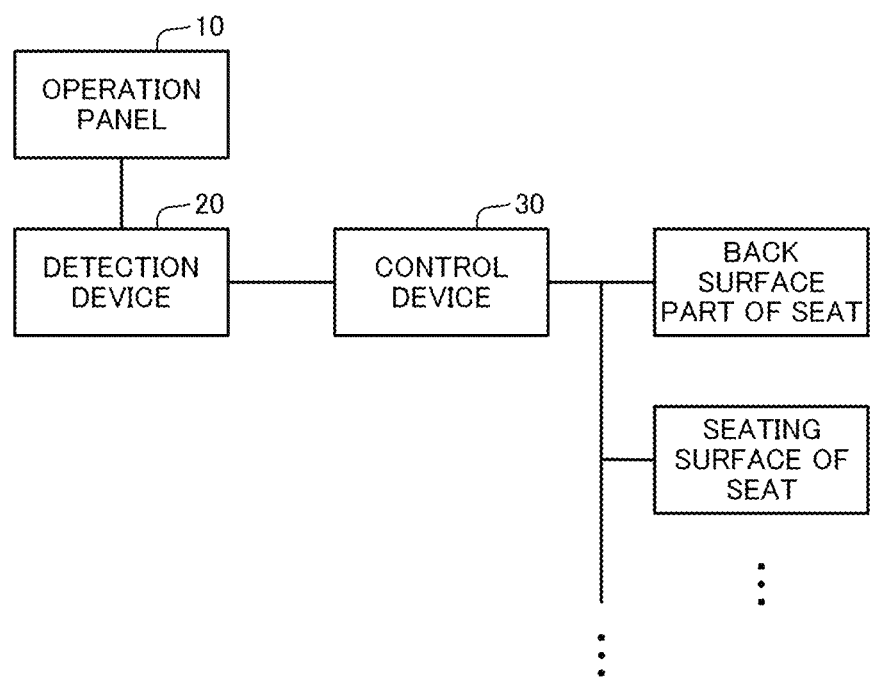
FIG. 3 shows a block diagram showing the outline of a configuration for moving an operation target including the operation device disclosed in FIG. 1.

A first example embodiment of the present invention will be described with reference to FIGS. 1 to 6. FIGS. 1 to 3 show views for describing a configuration of an operation device, and FIGS. 4 to 6 show views for describing an operation of the operation device.

Configuration

An operation device according to the present invention is mainly for operating a seat placed in an automobile that is a vehicle and is arranged, for example, on an armrest formed on a seat door. In particular, an operation device in this example embodiment is arranged on an armrest formed on a driver's seat door and allows an operator who is a driver to operate each part of a seat where the operator is seated. The seat includes, as components, a base part arranged on the floor surface of the vehicle, a seating surface part arranged on the base part, a rear surface part arranged at the back of the seating surface part, and a headrest arranged on top of the back surface part. Thus, the operation device is configured to allow operation of changing the angle of the back surface part, operation of moving the seat in the fore-and-aft direction, and operation of moving the seating surface part in the fore-and-aft direction and the vertical direction. In this example embodiment, as operation by the operation device, reclining operation of changing the angle of the back surface part of the seat will be described as an example. However, the operation device according to the present invention is not limited to operating the seat, and may be used for operating any component of the vehicle.

Reference numeral 100 of FIG. 1 denotes a view of the operation device in this example embodiment taken from above. As shown by the view denoted by reference numeral 100 of FIG. 1, the operation device includes an operation panel 10 having a substantially square shape. The operation panel 10 has, for example, a capacitive-type touch-sensitive operation surface, and is configured to detect a position on the operation surface touched through touch operation with an operator's finger. However, the operation panel 10 is not limited to being configured by the capacitive type, and may have any configuration as long as it can detect touch operation on the operation surface with an operation object such as a finger.

Specifically, the surface of the operation panel 10 is formed in a planar shape as a whole, and an illustration of the sheet is drawn as shown by a dotted line in the view denoted by reference numeral 100 of FIG. 1. Although the illustration of the sheet is drawn by a dotted line in the view denoted by reference numeral 100 of FIG. 1, the illustration of the seat may be drawn by a solid line or filled with a predetermined color. On part of the surface of the operation panel 10, guide parts 11 and 12 having a convex shape are formed. In particular, in this example embodiment, the guide parts 11 and 12 are formed so as to correspond to the positions of the illustrations of the respective parts configuring the sheet. For example, at the position of the illustration of the back surface part of the seat, as guide parts 11 and 12 for performing the operation of reclining the back surface part, two guide parts 11 and 12 (first guide part 11 and second guide part 12) having a predetermined length are formed in parallel in a pair. Moreover, two guide parts are formed in pairs at the front, middle, and rear positions in the illustration of the seating surface part of the seat, respectively, and the respective pairs of guide parts are used for performing fore-and-aft operation of the whole seat, fore-and-aft operation of the seat, and vertical operation. In this example embodiment, only the guide parts 11 and 12 formed at the position of the illustration of the back surface part of the seat will be described.

A cross-sectional view of the operation panel 10 taken along X-X line denoted by reference numeral 100 of FIG. 1 is denoted by reference numeral 101 of FIG. 1. As shown in the view denoted by reference numeral 101 of FIG. 1, the guide parts 11 and 12 are formed to have a convex shape protruding from the surface of the operation panel 10. Then, as shown in the view denoted by reference numeral 100 of FIG. 1, the guide parts 11 and 12 are formed so that the convex portions have a linear shape having a predetermined length and are arranged substantially in parallel with a predetermined space. The guide parts 11 and 12 are not necessarily limited to being formed by the convex portions, and may be formed by concave portions 11' and 12' as shown by reference numeral 102 of FIG. 1. Moreover, the guide parts 11 and 12 are not necessarily limited to being formed in a linear shape, and may be formed by a convex portion or a concave portion having a predetermined size.

Further, on the surface of the operation panel 10, operation locations specified in accordance with the positions of the above guide parts 11 and 12 are set. For example, on the surface of the operation panel 10 in this example embodiment, in planar operation parts that are operation locations having a planar shape where the guide parts 11 and 12 are not formed, a first operation region R1, a second operation region R2, and a third operation region R3 are set as predetermined operation locations as shown in gray in a view denoted by reference numeral 110 of FIG. 2. Specifically, first, the first operation region R1 is set around the first guide part 11 and on one side of the first guide part 11 located opposite the second guide part 12. The second operation region R2 (first specific operation location) is set at a position between the first guide part 11 and the second guide part 12. The third operation region R3 (second specific operation location) is set around the second guide part 12 and on one side of the second guide part 12 located opposite the first guide part 11. Reference numeral 111 of FIG. 2 denotes a cross-sectional view taken along line X-X in the view denoted by reference numeral 100 of FIG. 1 of the operation panel 10, and the cross-sectional view illustrates the first operation region R1, the second operation region R2, and the third operation region R3.

As shown in FIG. 3, the operation device includes a detection device 20 (detection unit) that detects touch operation by the operator on the operation panel 10. The detection device 20 detects a touch position on the operation panel 10 and the content of the touch operation, and accepts an operation instruction previously set in accordance with the touch position and the content of the touch operation. In particular, the detection device 20 detects slide operation of straddling the first guide part 11 and the second guide part 12 in the widthwise direction by detecting a touch position and a slide direction by touch operation on the first operation region R1, second operation region R2, and third operation region R3 described above, and accepts an operation instruction set in accordance with the status of operation on the guide parts 11 and 12.

Specifically, the detection device 20 detects, as a guide operation status of straddling the guide parts 11 and 12, the number of straddles, which is the number of guide parts 11 and 12 straddled through slide operation from the first operation region R1 or the third operation region R3. As an example, the detection device 20 detects the number of straddles "1" when detecting operation such that an operator's finger F straddles the first guide part 11 from the first operation region R1 along the widthwise direction and thereafter moves to the second operation region R2 as shown by a view denoted by reference numeral 200 of FIG. 4. Moreover, the detection device 20 detects the movement operation from the first operation region R1 to the second operation region R2 as "first guide operation status" corresponding to the number of straddles "1". Likewise, the detection device 20 detects the number of straddles "1" when detecting operation such that, in the opposite way to the above, the operator's finger F straddles the second guide part 12 from the third operation region R3 along the widthwise direction and thereafter moves to the second operation region R2 as shown by a view denoted by reference numeral 201 of FIG. 4. Moreover, the detection device 20 detects the movement operation from the third operation region R3 to the second operation region R2 as "first guide operation status" corresponding to the number of straddles "1".

Further, the detection device 20 detects the number of straddles "2" when detecting operation such that the operator's finger F straddles the first guide part 11 from the first operation region R1 along the widthwise direction to move to the second operation region R2 and subsequently straddles the second guide part 12 along the widthwise direction to move to the third operation region R3 as shown by a view denoted by reference numeral 210 of FIG. 5. Moreover, the detection device 20 detects the movement operation from the first operation region R1 to the third operation region R3 through the second operation region R2 as "second guide operation status" corresponding to the number of straddles "2". Likewise, the detection device 20 detects the number of straddles "2" when detecting operation such that, in the opposite way to the above, the operator's finger F straddles the second guide part 12 from the third operation region R3 along the widthwise direction to move to the second operation region R2 and subsequently straddles the first guide part 11 along the widthwise direction to move to the first operation region R1 as shown by a view denoted by reference numeral 211 of FIG. 5. Moreover, the detection device 20 detects the movement operation from the third operation region R3 to the first operation region R1 through the second operation region R2 as "second guide operation status" corresponding to the number of straddles "2".

After detecting the guide operation status as described above, the detection device 20 further detects touch operation and accepts the touch operation as an operation instruction set in accordance with the detected guide operation status. Specifically, after detecting "first guide operation status" of straddling only the first guide part 11 or the second guide part 12, the detection device 20 detects touch operation on the second operation region R2 corresponding to the "first guide operation status". At the time, the second operation region R2 corresponding to the "first guide operation status" is set so as to accept an operation instruction to change the angle of the back surface part of the seat at a preset "normal speed". Therefore, in the case of, after the operator's finger F straddles only the first guide part 11 from the first operation region R1, detecting continuous touch operation on the second operation region R2 as shown by the view denoted by reference numeral 200 of FIG. 4, the detection device 20 accepts as an instruction to move at the "normal speed" in the same direction as the slide direction, that is, in a direction to recline the back surface part of the seat while the touch operation continues. Likewise, in the case of, after the operator's finger F straddles only the second guide part 12 from the third operation region R3, detecting continuous touch operation on the second operation region R2 as shown by the view denoted by reference numeral 201 of FIG. 4, the detection device 20 accepts as an instruction to move at the "normal speed" in the same direction as the slide direction, that is, in a direction to raise the back surface part of the seat while the touch operation continues.

Further, after detecting "second guide operation status" of subsequently straddling the first guide part 11 and the second guide part 12, the detection device 20 detects touch operation on the third operation region R3 or the first operation region R1 corresponding to the "second guide operation status". At the time, the third operation region R3 corresponding to "second guide operation status" is set so as to accept an operation instruction to change the angle of the back surface part of the seat at a "high speed" that is faster than the abovementioned normal speed. Therefore, in the case of, after the operator's finger F straddles the first guide part 11 and the second guide part 12 from the first operation region R1, detecting continuous touch operation on the third operation region R3 as shown by the view denoted by reference numeral 210 of FIG. 5, the detection device 20 accepts as an instruction to move at the "high speed" in the same direction as the slide direction, that is, in a direction to recline the back surface part of the seat while the touch operation continues. Likewise, in the case of, after the operator's finger F straddles the second guide part 12 and the first guide part 11 from the third operation region R3, detecting continuous touch operation on the first operation region R1 as shown by the view denoted by reference numeral 211 of FIG. 5, the detection device 20 accepts as an instruction to move at the "high speed" in the same direction as the slide direction, that is, in a direction to raise the back surface part of the seat while the touch operation continuous.

In this example embodiment, "status of slide operation on guide part" is a status of completely straddling the guide part through the slide operation and, in particular, in this example embodiment, a status specified by the number of straddled guide parts. In the above example, the number of straddles representing the number of straddled guide parts is "1" or "2", and "first guide operation status" and "second guide operation status" correspond to the respective numbers of straddles.

Further, in this example embodiment, there are a case where "operation location of planar operation part to be operated later" is the second operation region R2 and a case where "operation location of planar operation part to be operated later" is the third operation region R3 or the first operation region R1 in the above example. In particular, in this example embodiment, "later operation location" corresponding to the value of the number of straddles is the second operation region R2 in the case of the number of straddles "1" and is the third operation region R3 or the first operation region R1 in the case of the number of straddles "2". In this example embodiment, an operation instruction corresponding to later operation on the planar operation part is set in accordance with the later operation location and the number of straddles.

In this example embodiment, "plurality of specific operation locations corresponding to respective values of the numbers of straddles" are the second operation region R2 in the case of the number of straddles "1" and the first operation region R1 or the third operation region R3 in the case of the number of straddles "2". Moreover, in this example embodiment, "operation on specific operation location after slide operation on guide part" is continuous touch operation on each of the operation regions R1 to R3. Moreover, in this example embodiment, "operation instruction set in accordance with status of slide operation on guide part" is an operation instruction to move the back surface part of the seat at a "normal speed" set for "first guide operation status" of straddling one guide part, and an operation instruction to move the back surface part of the seat at a "high speed" that is higher than the "normal speed" set for "second guide operation status" of straddling two guide parts.

In this example embodiment, an operation instruction accepted by the second operation region R2 and an operation instruction accepted by the third operation region R3 or the first operation region R1 in accordance with the guide operation statuses are set so that the targets are the same component such as the back surface part of the seat, but the operation instruction contents are different, for example, speeds to change the angle are different. Meanwhile, the operation instruction accepted by the second operation region R2 and the operation instruction accepted by the third operation region R3 or the first operation region R1 in accordance with the guide operation statuses may have contents such that the targets are different components.

The operation device includes a control device 30 as shown in FIG. 3, and the control device 30 controls a component to move in accordance with an operation instruction accepted by the detection device 20 as described above. For example, in a case where the detection device 20 accepts an operation instruction to change the angle of the back surface part of the seat as described above, the control device 30 controls to change the back surface part of the seat in the accepted direction at the accepted speed.

Operation

Next, an operation of the operation device when the above operation panel 10 is operated will be described mainly with reference to a flowchart of FIG. 6. Herein, a case where the operator performs operation of reclining the back surface part of the seat will be described as an example.

First, as shown by the view denoted by reference numeral 200 of FIG. 4, when detecting touch operation performed in the first operation region R1 by the operator (step S1, Yes), the operation device then detects whether or not operation of straddling the guide part 11 along the widthwise direction is performed through slide operation (step S2). When detecting the operation of straddling the first guide part 11 from the first operation region R1 performed by the operator (step S2, Yes), the operation device then detects whether or not operation of straddling the second guide part 12 along the widthwise direction is subsequently performed (step S3) and whether or not operation on the second operation region R2 is performed (step S4).

At the time, in the case of detecting that the operation of subsequently straddling the second guide part 12 is not subsequently performed by the operator (step S3, No) and the operation on the second operation region R2 is performed (step S4, Yes), the operation device determines it to be "first guide operation status" and accepts the operation on the second operation region R2. That is to say, the detection device detects continuous touch operation on the second operation region R2 by the operator, and accepts the operation as an instruction to move the back surface part of the seat in a direction to recline at the "normal speed" while the touch operation continues. Then, the operation device controls to move the back surface part of the seat at the normal speed in response to the accepted instruction to move (step S5).

On the other hand, as shown by the view denoted by reference numeral 210 of FIG. 5, in a case where the operation of straddling the first guide part 11 is performed by the operator (step S2, Yes) and thereafter the operation of straddling the second guide part 12 is subsequently performed (step S3, Yes), the operation device then detects whether or not operation on the third operation region R3 is performed (step S6). Then, in the case of detecting that the operation on the third operation region R3 performed by the operator (step S6, Yes), the operation device determines it to be "second guide operation status", and accepts the operation on the third operation region R3. That is to say, the operation device detects continuous touch operation on the third operation region R3 performed by the operator, and accepts as an instruction to move the back surface part of the seat in the direction to recline at a "high speed" while the touch operation continues. Then, the operation device controls to move the back surface part of the seat at the high speed in response to the accepted instruction to move (step S7).

As described above, the operation device according to the present invention has a guide part on the operation panel 10 and is configured to detect slide operation like straddling the guide part and accept later operation as an operation instruction set in accordance with the status of the slide operation on the guide part. Thus, by setting the number of guide parts and the operation status of the slide operation on the guide part to be more than one, it is possible to realize various operations on the component of a vehicle, and it is possible to further increase the operability. Moreover, by forming a convex or concave guide part, the operator's operation without looking is facilitated, and it is possible to further increase the operability.

Although the above operation device has two guide parts and three operation regions, and accepts operation on the second operation region R2 when one of the guide parts is straddled and accepts operation on the third operation region R3 or the first operation region R1 when the two guide parts are straddled, an operation region to accept operation may be one. For example, in both a case where one of the guide parts is straddled and a case where the two guide parts are straddled, operation on the second operation region R2 may be accepted later. In this case, the operation on the second operation R2 after one of the guide parts is straddled may be accepted as an operation instruction to move the back surface part of the seat at the "normal speed", and the operation on the second operation region R2 after the two guide parts are straddled may be accepted as an operation instruction to move the back surface part the seat at the "high speed".

Further, the operation device may have three or more guide parts and have three or more operation regions to accept operation in accordance with the number of straddled guide parts, or three or more kinds of operation contents to accept may be set. For example, in a case where the operation device has three or more guide parts, later operation on a specific operation region may be accepted as different operation instructions in accordance with the number of guide parts straddled through the slide operation.

Further, although the operation device detects a guide operation status and thereafter detects touch operation on each operation region corresponding to the guide operation status as described above, the operation device is not limited to detecting continuous touch operation on each operation region as described above, and may detect any touch operation. As an example, the operation device may detect a guide operation status and thereafter detect slide operation on an operation region corresponding to the detected guide operation status, and may accept an operation instruction set in accordance with the slide operation.

Second Example Embodiment

Next, a second example embodiment of the present invention will be described with reference to FIGS. 7 to 11. FIGS. 7 to 8 are views for describing a configuration of an operation device, and FIGS. 9 to 11 are views for describing an operation of the operation device.

Configuration

Although the operation device in this example embodiment has almost the same configuration as in the first example embodiment described above, the configuration of a guide part is different. That is to say, while the two guide parts 11 and 12 corresponding to the back surface part of the seat are formed in the first example embodiment, the operation device in this example embodiment has only one guide part 13 corresponding to the back surface part of the seat. Specifically, as shown by a view denoted by reference numeral 120 of FIG. 7, the operation panel 10 of the operation device has one substantially band-shaped guide part 13 having a predetermined width in the widthwise direction and a predetermined length in the lengthwise direction at the position of the illustration of the back surface part of the sheet. As shown in a cross-sectional view taken along line X-X denoted by reference numeral 121 of FIG. 7, the guide part 13 has a convex shape protruding from the surface of the operation panel 10, and the surface of the guide part 13 is formed flat. However, the guide part 13 is not necessarily limited to being formed by a convex portion, and may be formed by a concave portion 13' as shown a view denoted by reference numeral 122 of FIG. 7. Moreover, one band-shaped guide part is formed at the position of the illustration of the seating surface part of the seat, and an operation target is set so as to vary for each position in the lengthwise direction of the guide part. In this example embodiment, only the guide part 13 formed at the position of the illustration of the back surface part of the seat will be described.

On the surface of the operation panel 10, an operation location specified in accordance with the position of the guide part 13 described above is set. For example, on the surface of the operation panel 10 in this example embodiment, in a portion where the guide part 13 is formed and a planar operation part that is a plane-shaped operation location where the guide part 13 is not formed, a first operation region R11, a second operation region R12, and a third operation region R13 are set as predetermined operation locations as shown in gray in a view denoted by reference numeral 130 of FIG. 8. Specifically, first, the first operation region R11 and the third operation region R13 are set around the guide part 13 on the respective sides of the guide part 13. Among them, the first operation region R11 located on the left side of the guide part 13 and the third operation region R13 located on the right side of the guide part 13 in the view denoted by reference numeral 120 of FIG. 7 each serve as an operation location operated when operation starts and serve as an operation location to accept operation performed after operation of straddling the guide part 13 as will be described later (second specific operation location). Moreover, the second operation region R12 (first specific operation location) is set at the surface position of the guide part 13. Reference numeral 131 of FIG. 8 denotes a cross-sectional view taken along line X-X in the view denoted by reference numeral 120 of FIG. 7 of the operation panel 10. In the cross-sectional view, the first operation region R11, the second operation region R12, and the third operation region R13 are illustrated.

Then, by detecting a touched position and a slide direction through touch operation on the first operation region R11, the second operation region R2 and the third operation region R13 described above, the detection device 20 of the operation device detects slide operation of straddling the guide part 13 in the widthwise direction, and accepts an operation instruction set in accordance with the status of the operation on the guide part 13.

Specifically, the detection device 20 detects operation to straddle the guide part 13 through the slide operation from the first operation region R11 or the third operation region R13, and operation of completely straddling, as a guide operation status of straddling the guide part 13. As an example, the detection device 20 detects a status where the operator's finger F runs aground on the guide part 13 from the first operation region R11 and stops in the second operation region R12 on the guide part 13 in the course of straddling the guide part 13 along the widthwise direction as shown by a view denoted by reference numeral 220 of FIG. 9, as "first guide operation status" corresponding to the number of straddles "0". Likewise, the detection device 20 detects a status where the operator's finger F runs aground on the guide part 13 from the third operation region R13 and stops in the second operation region R12 on the guide part 13 in the course of straddling the guide part 13 along the widthwise direction as shown by a view denoted by reference numeral 221 of FIG. 9, as "first guide operation status" corresponding to the number of straddles "0". Moreover, the detection device 20 detects a status where the operator's finger F completely straddles the guide part 13 from the first operation region R11 along the widthwise direction and moves to the third operation region R13 as shown by a view denoted by reference numeral 230 of FIG. 10, as "second guide operation status" corresponding to the number of straddles "1". Likewise, the detection device 20 detects a status where the operator's finger F completely straddles the guide part 13 from the third operation region R13 along the widthwise direction and moves to the first operation region R11 as shown by a view denoted by reference numeral 231 of FIG. 10, as "second guide operation status" corresponding to the number of straddles "1".

Then, after detecting the guide operation status as described above, the detection device 20 further detects touch operation, and accepts the touch operation as an operation instruction set in accordance with the detected guide operation status. Specifically, after detecting "first guide operation status" representing a status in the course of straddling the guide part 13, the detection device 20 detects touch operation on the second operation region R12 corresponding to the "first guide operation status". At the time, the second operation region R12 corresponding to "first guide operation status" is set to accept an operation instruction to change the angle of the back surface part of the seat at a previously set "normal speed". Therefore, in a case where the operator's finger F slides from the first operation region R11 and stops in the second operation region R12 in the course of straddling the guide part 13 and the operation device 20 detects continuous touch operation on the second operation region R12 as shown by the view denoted by reference numeral 220 of FIG. 9, the detection device 20 accepts as an instruction to move at the "normal speed" in the same direction as the slide direction, that is, in the direction to recline the back surface part of the seat while the touch operation continues. Likewise, in a case where the operator's finger F slides from the third operation region R13 and stops in the second operation region R12 in the course of straddling the guide part 13 and the detection device 20 detects continuous touch operation on the second operation region R12 as shown by the view denoted by reference numeral 221 of FIG. 9, the detection device 20 accepts as an instruction to move at the "normal speed" in the same direction as the slide direction, that is, in the direction to raise the back surface part of the seat while the touch operation continues.

Further, after detecting "second guide operation status" representing the status of having completely straddled the guide part 13, the detection device 20 detects touch operation on the third operation region R13 or the first operation region Ru corresponding to the "second guide operation status". At the time, the third operation region R13 or the first operation region R11 corresponding to "second guide operation status" is set to accept an operation instruction to change the angle of the back surface part of the seat at a "high speed" that is a higher speed than the abovementioned normal speed. Therefore, in a case where the operator's finger F slides from the first operation region R11 and completely straddles the guide part 13 and thereafter the detection device 20 detects continuous touch operation on the third operation region R13 as shown by a view denoted by reference numeral 230 of FIG. 10, the detection device 20 accepts as an instruction to move at the "high speed" in the same direction as the slide direction, that is, in the direction to recline the back surface part of the seat while the touch operation continues. Likewise, in a case where the operator's finger F slides from the third operation region R13 and completely straddles the guide part 13 and thereafter the detection device 20 detects continuous touch operation on the first operation region R11 as shown by a view denoted by reference numeral 231 of FIG. 10, the detection device 20 accepts as an instruction to move at the "high speed" in the same direction as the slide direction, that is, in the direction to raise the back surface part of the seat while the touch operation continues.

In this example embodiment, "status of slide operation on guide part" includes a status in the course of straddling the guide part through the slide operation and a status of completely straddling the guide part. In the above example, there are "first guide operation status" representing a status in the middle of straddling the guide part 13 and "second guide operation status" representing a status of having completely straddled the guide part 13. In this example embodiment, "first guide operation status" representing a status in the course of straddling the guide part 13 is also expressed as the number of straddles "0", and "second guide operation status" representing a status of having completely straddled the guide part 13 is also expressed as the number of straddles "1".

Further, in this example embodiment, there are a case where "later operation location of planar operation part" is the second operation region R12 (that is, on the guide part 13) and a case where "later operation location of planar operation part" is the third operation region R13 or the first operation region R11. Moreover, in this example embodiment, "later operation on operation location" includes continuous touch operation that is operation of remaining on the guide part 13, that is, on the second operation region R12 or on the third operation region R13 or the first operation region R11.

Then, in this example embodiment, "plurality of specific operation locations corresponding to respective values of numbers of straddles" are the second operation region R12 in the case of the number of straddles "0" and the third operation region R13 or the first operation region R11 in the case of the number of straddles "1".

Further, in this example embodiment, "operation instruction set in accordance with later status" includes an operation instruction to move the back surface part of the seat at the "normal speed" set for operation of remaining on the second operation region R12 in the course of straddling the guide part, and an operation instruction to move the back surface part of the seat at the "high speed", which is higher than the "normal speed", set for operation of remaining in the third operation region R13 or the first operation region R11 after completely straddling the guide part. In this example embodiment, an operation instruction corresponding to later operation on the planar operation part is set in accordance with the later operation location and the number of straddles.

The control device 30 of the operation device in this example embodiment controls to move the same component of the vehicle in accordance with an operation instruction accepted by the detection device 20 in the same manner as described above. For example, in a case where the detection device 20 accepts an operation instruction to change the angle of the back surface part of the seat as described above, an operation instruction accepted by the second operation region R12 and an operation instruction accepted by the third operation region R13 or the first operation region R11 are set so that the targets are the same component such as the back surface part of the seat, but the operation instruction contents are different, for example, speeds to change the angle are different.

Operation

Next, an operation of the operation device when the above operation panel 10 is operated will be described mainly with reference to a flowchart of FIG. 11. Herein, a case where the operator performs operation of reclining the back surface part of the seat will be described as an example.

First, when detecting touch operation performed by the operator on the first operation region R11 (step S11, Yes) as shown by the view denoted by reference numeral 220 of FIG. 9, the operation device then detects whether or not operation to straddle the guide part 13 along the widthwise direction, that is, operation of making the finger F running aground on the guide part 13 is performed through a slide operation (step S12). When detecting the operation of running aground to straddle the guide part 13 from the first operation region R11 is performed by the operator (step S12, Yes), the detection device then detects whether or not to completely straddle the guide part 13 along the widthwise direction (step S13) and whether or not the second operation region R12 is operated (step S14).

At the time, in the case of detecting that the operation of completely straddling the guide part 13 is not performed by the operator (step S13, No) and operation on the second operation region R12 on the guide part 13 is performed (step S14, Yes) as shown by the view denoted by reference numeral 221 of FIG. 9, the operation device determines it to be "first guide operation status" and accepts the operation on the second operation region R12. That is to say, the operation device detects continuous touch operation on the second operation region R12 by the operator, and accepts as an instruction to move in a direction to recline the back surface part of the seat at the "normal speed" while the touch operation continues. Then, the operation device controls to move the back surface part of the seat at the normal speed in response to the accepted instruction to move (step S15).

On the other hand, in a case where the operation of completely straddling the guide part 13 is performed by the operator (step S13, Yes) as shown by the view denoted by reference numeral 230 of FIG. 10, the operation device then detects whether or not operation on the third operation region R13 is performed (step S16). In the case of detecting that the operation on the third operation region R13 is performed by the operator (step S16, Yes), the operation device determines it to be "second guide operation status", and accepts the operation on the third operation region R13. That is to say, the operation device detects continuous touch operation on the third operation region R13 by the operator, and accepts as an instruction to move in a direction to recline the back surface part of the seat at the "high speed" while the touch operation continues. Then, the operation device controls to move the back surface part of the seat at the high speed in response to the accepted instruction to move (step S17).

As described above, the operation device according to the present invention is provided with a guide part on the operation panel 10 and is configured to detect slide operation to straddle the guide part and accept subsequent operation as an operation instruction set in accordance with the status of the slide operation on the guide part. Thus, by setting a plurality of operation statuses of the slide operation on the guide part, it is possible to realize various kinds of operation on the component of the vehicle, and it is possible to further increase the operability. Moreover, forming a convex or concave guide part facilitates operation without looking by the operator, and the operability can be further increased.

The operation device may be provided with a plurality of guide parts that allow operation on the surface as described above. In a case where the operation device is provided with a plurality of guide parts, an operation region may be set between the guide parts as in the first example embodiment. With this, operation to straddle the plurality of guide parts and the operation of completely straddling may be combined to set a plurality of guide operation statuses and set so as to accept an operation instruction corresponding to each of the statuses.

As shown in the first and second example embodiments described above, a predetermined operation location after slide operation on the guide part, operation on the predetermined operation location, and the like, vary with the form and position of the guide part and each operation region. A contact with the guide part may be detected directly by an appropriate detection member provided at a location where the guide part is arranged and, in a case where the operation regions R1 to R3 are adjacent to the guide parts 11 and 12 as in the embodiment shown in FIG. 1, the operation on the guide parts 11 and 12 may be detected by detecting slide operation between the operation regions without detecting a contact on the guide part. For example, indirect contact detection can also be employed that also considers, based on detection of a slide from the first operation region R1 to the second operation region R2 and detection of a slide from the second operation region R2 to the third operation region R3, contact with the guide parts 11 and 12 at the boundary of the regions.

Third Example Embodiment

Next, a third example embodiment of the present invention will be described with reference to FIG. 12. FIG. 12 is a view for describing a configuration of an operation device.

The operation device in this example embodiment is for operating to open and close the window of an automobile that is a vehicle and is, for example, arranged on an armrest formed on a seat door. In particular, the operation device in this example embodiment includes an operation panel 50 arranged on an armrest formed on the door of the driver's seat, and the operation panel 50 includes four divisions corresponding to the respective windows of the four seats. Below, an operation device corresponding to the window of one of the seats will be described.

As shown by a view denoted by reference numeral 140 of FIG. 12, the operation panel 50 corresponding to the window of the one seat is formed in a substantially rectangular shape, and is arranged so that the lengthwise direction lies in the fore-and-aft direction of the vehicle. The operation panel 50 has, in the vicinity of the middle in the lengthwise direction, a substantially band-shaped guide part 51 extending in the width direction of the operation panel 50 and having a predetermined length. As shown in a cross-sectional view taken along X-X line denoted by reference numeral 141 of FIG. 12, the guide part 51 has a convex shape protruding from the surface of the operation panel 50, and the surface of the guide part 51 is formed to be flat. However, the guide part 51 is not necessarily limited to being formed by a convex portion, and may be formed by a concave portion.

On the surface of the operation panel 50, an operation location specified in accordance with the position of the above guide part 51 is set. For example, on the surface of the operation panel 50 in this example embodiment, at a portion where the guide part 51 is formed and a planar operation part that is a planar operation location where the guide part 51 is not formed, a first operation region R21, a second operation region R22, and a third operation region R23 are set as specific operation locations as shown in gray in the view denoted by reference numeral 110 of FIG. 12. Specifically, first, the first operation region R21 and the third operation region R23 are set, respectively, around the guide part 51 and in the front and rear positions of the guide part 51. Among them, the first operation region R21 located in the front position of the guide part 51 and the third operation region R23 located in the rear of position of the guide part 51 in the view denoted by reference numeral 140 of FIG. 12 are operation locations operated when operation starts and furthermore operation locations (second specific operation locations) operated at the time of closing (UP) or opening (DOWN) the window. Moreover, on the surface position of the guide part 51, the second operation region R22 (first specific operation location) is set.

Then, by detecting a touch position through touch operation on the above first operation region R21, second operation region R22 and third operation region R23 and a slide direction, the detection device 20 of the operation device detects slide operation of straddling the guide part 51 in the widthwise direction, and accepts an operation instruction set in accordance with the status of the operation on the guide part 51.

Specifically, the detection device 20 detects, as a guide operation status of straddling the guide part 51, operation to straddle the guide part 51 through slide operation from the first operation region R21 or the third operation region R23, and operation of completely straddling. As an example, the detection device 20 considers movement operation in which the operator's finger runs aground on the guide part 51 from the first operation region R21 and stops in the second operation region R22 on the guide part 51 in the course of straddling the guide 51 along the widthwise direction as the number of straddles "0", and detects as "first guide operation status". Likewise, the detection device 20 considers movement operation in which the operator's finger runs aground on the guide part 51 from the third operation region R23 and stops in the second operation region R22 on the guide part 51 in the course of straddling the guide 51 along the widthwise direction as the number of straddles "0", and detects as "first guide operation status". Moreover, the detection device 20 considers movement operation in which the operator's finger F completely straddles the guide part 51 from the first operation region R21 along the widthwise direction and moves to the third operation region R23 as the number of straddles "1", and detects as "second guide operation status". Likewise, the detection device 20 considers movement operation in which the operator's finger F completely straddles the guide part 51 from the third operation region R23 along the widthwise direction and moves to the first operation region R21 as the number of straddles "1", and detects as "second guide operation status".

In this example embodiment, "status of slide operation on guide part" is the status of operation of straddling the guide part 51 through the slide operation and includes "first guide operation status" and "second guide operation status" corresponding to the respective statuses.

Further, in this example embodiment, there are a case where "later operation location of planar operation part" is the third operation region R23 and a case where "later operation location of planar operation part" is the first operation region R21 in the above example. In this example embodiment, an operation instruction corresponding to later operation on the planar operation part is set in accordance with the later operation location and the number of straddles.

In this example embodiment, there are a case where "operation location of planar operation part operated later" is the second operation region R22 and a case where "operation location of planar operation part operated later" is the third operation region R23 or the first operation region R21 in the above example. In particular, in this example embodiment, "later operation location" corresponding to each value of the numbers of straddles is the second operation region R22 in the case of the number of straddles "0", and is the third operation region R23 or the first operation region R21 in the case of the number of straddles "1". In this example embodiment, an operation instruction corresponding to the later operation of the planar operation part is set in accordance with the later operation location and the number of straddles.

Then, after detecting the guide operation status as described above, the detection device 20 further detects touch operation and accepts the touch operation as an operation instruction set in accordance with the detected guide operation status. Specifically, the detection device 20 accepts touch operation after detecting "first guide operation status" in the course of straddling the guide part 51 as an instruction to perform "manual" opening/closing operation for a window corresponding to the "first guide operation status". As an example, in a case where, after detecting "first guide operation status" in the course of straddling the guide part 51 from the first operation region R21, the operator's finger F remains in the second operation region R22 on the guide part 15 and the detection device 20 detects continuous touch operation on the second operation region R22, the detection device 20 accepts as a manual opening/closing operation instruction to close the window while the touch operation continues. Likewise, in a case where, after detecting "first guide operation status" in the course of straddling the guide part 51 from the third operation region R23, the operator's finger F remains in the second operation region R22 on the guide part 15 and the detection device 20 detects continuous touch operation on the second operation region R22, the detection device 20 accepts as a manual opening/closing operation instruction to open the window while the touch operation continues.

Further, the detection device 20 accepts touch operation after detecting "second guide operation status" of having completely straddled the guide part 51 as an instruction to perform "automatic" opening/closing operation on a window corresponding to the "second guide operation status". As an example, in the case of, after detecting "second guide operation status" where the operator's finger F has completely straddled the guide part 51 from the first operation region R21, detecting continuous touch operation on the third operation region R23, the detection device 20 accepts as an automatic opening/closing operation instruction to automatically open/close until the window completely closes while the touch operation continues. Likewise, in the case of, after detecting "second guide operation status" where the operator's finger F has completely straddled the guide part 51 from the third operation region R23, detecting continuous touch operation on the first operation region R21, the detection device 20 accepts as an automatic opening/closing operation instruction to automatically open/close until the window completely opens while the touch operation continues.

The control device 30 of the operation device in this example embodiment controls to move each of the same components of the vehicle in accordance with an operation instruction accepted by the detection device 20 in the same manner as described above. For example, the detection device 20 accepts a window "manual" opening/closing operation instruction and a window "automatic" opening/closing operation instruction as described above, and the detection device 20 is configured to, even if the targets are the same components such as windows, perform operation instructions having different contents such as "manual" opening/closing operation and "automatic" opening/closing operation for the windows.

The above operation instruction is an example, and the operation device according to the present invention can be set so as to accept any operation instruction for any component as long as the component is installed in a vehicle.

Fourth Example Embodiment

Next, a fourth example embodiment of the present invention will be described with reference to FIGS. 13 to 14. FIG.

13 is a view for describing a configuration of an operation device, and FIG. 14 is a view for describing an operation of the operation device.

The operation device in this example embodiment is for operating a navigation system, audio system, an air conditioner, and the like, mounted in an automobile that is a vehicle, and functions as a multi control panel. An operation panel 60 configuring the operation device is arranged on the surface of a steering wheel as shown by a view denoted by reference numeral 300 of FIG. 13. Although the example of the view denoted by reference numeral 300 of FIG. 13 shows the operation panels 60 arranged on both sides of the steering wheel, any number of operation panels 60 may be arranged in any locations in the vehicle.

As shown by a view denoted by reference numeral 301 of FIG. 13, the operation panel 60 is formed in a substantially circular shape, and four arc-shaped guide parts 61 are formed on the identical inner circumference. The guide part 61 has a predetermined length in the circumferential direction and is formed in a substantially band shape. The guide part 61 has a convex shape protruding from the surface of the operation panel 60, and the surface of the guide part 61 is formed flat. However, the guide part 61 is not necessarily limited to being formed by a convex portion, and may be formed by a concave portion.

On the surface of the operation panel 60, an operation location specified in accordance with the position of the above guide part 61 is set. For example, on the surface of the operation panel 60 in this example embodiment, at a portion where the guide part 61 is formed and a planar operation part that is a planar operation location where the guide part 61 is not formed, a first operation region R31, a second operation region R32 and a third operation region R33 are set as specific operation locations as shown in gray in the view denoted by reference numeral 310 of FIG. 14. Specifically, first, the first operation region R31 is set at a position in the vicinity of the center of the substantially circular operation panel 60 and surrounded by the four guide parts 61. Moreover, the second operation region R32 (first specific operation location) is set at the surface position of each of the guide parts 61. Moreover, the third operation region R33 having an annular shape is set at a position in the vicinity of the outermost circumference of the substantially circular operation panel 60 and outside the four guide parts 61.

The detection device 20 of the operation device detects a touch position through touch operation on the above first operation region R31, second operation region R32 and third operation region R33 and a slide direction to detect slide operation of straddling the guide part 61 in the widthwise direction, and accepts an operation instruction set in accordance with the status of the operation on the guide part 61.

Specifically, the detection device 20 detects operation to straddle the guide part 61 from the first operation region R31 through the slide operation and operation of completely straddling as the guide operation status of straddling the guide part 61. As an example, the detection device 20 considers movement operation such that the operator's finger rides aground on the guide part 61 from the first operation region R31 and stops in the second operation region R32 on the guide part 61 in the course of straddling the guide part 61 along the widthwise direction as shown in a view denoted by reference numeral 311 of FIG. 14, as the number of straddles "0", and detects as "first guide operation status". Moreover, the detection device 20 considers movement operation such that the operator's finger completely straddles the guide part 61 from the first operation region R31 along the widthwise direction and moves to the third operation region R33, as the number of straddles "1", and detects as "second guide operation status". Meanwhile, the detection device 20 may consider movement operation such that the operator's finger rides aground on the guide part 61 from the third operation region R33 and stops in the second operation region R32 on the guide part 61 in the course of straddling the guide part 61 along the widthwise direction, as the number of straddles "0", and detect as "first guide operation status". Moreover, the detection device 20 may consider movement operation such that the operator's finger completely straddles the guide part 61 from the third operation region R33 along the widthwise direction and moves to the first operation region R31, as the number of straddles "1", and detect as "second guide operation status".

In this example embodiment, "status of slide operation on guide part" includes "first guide operation status" and "second guide operation status" corresponding to the respective kinds of operation of straddling the guide part 61 through the slide operation.

Further, in this example embodiment, there are a case where "later operation location of planar operation part" is the third operation region R33 and a case where "later operation location of planar operation part" is the first operation region R31 in the above example. In this example embodiment, an operation instruction corresponding to the later operation of the planar operation part is set in accordance with the later operation location and the number of straddles.

In this example embodiment, there are a case where "operation location of planar operation part operated later" is the second operation region R32 and a case where "operation location of planar operation part operated later" is the third operation region R33 or the first operation region R31 in the above example. In particular, in this example embodiment, "later operation location" corresponding to each value of the numbers of straddles is the second operation region R32 in the case of the number of straddles "0", and is the third operation region R33 or the first operation region R31 in the case of the number of straddles "1". In this example embodiment, the operation instruction corresponding to the later operation of the planar operation part is set in accordance with the later operation location and the number of straddles.

Then, after detecting the guide operation status as described above, the detection device 20 further detects touch operation and accepts the touch operation as an operation instruction set in accordance with the detected guide operation status. Specifically, the detection device 20 accepts touch operation on the guide part 61 after detecting "first guide operation status" of stopping in the course of straddling the guide part 61 as an instruction to perform movement operation for a cursor and the like on a screen displayed by a navigation system and the like corresponding to the "first guide operation status". That is to say, after stopping in the course of straddling the guide part 61, the detection device 20 detects slide operation on the arc-shaped second operation region R32, and accepts as an operation instruction to move a cursor and the like on a screen in a slide direction. Moreover, the detection device 20 accepts touch operation on the third operation region R33 after detecting "second guide operation status" of completely straddling the guide part 61, as an instruction to perform operation of moving the hierarchy of a menu, a folder or the like on the screen displayed by a navigation system or an audio system corresponding to the "second guide operation status". That is to say, after the guide part 61 is completely straddled, the detection device 20 detects slide operation on the annular third operation region R33, and accepts as an operation instruction to move the hierarchy of a menu or a folder displayed on the screen in accordance with the slide direction. The detection device 20 may detect other touch operation such as continuous touch operation on each operation region as the touch operation after detecting the guide operation status, and accepts an operation instruction corresponding to the touch operation.

The control device 30 of the operation device in this example embodiment controls to move each of the same components of the vehicle shown as an operation member including a display member displaying GUI and the like in accordance with an operation instruction accepted by the detection device 20 in the same manner as described above. For example, as described above, operation instructions accepted by the detection device 20 have different contents, such as movement operation of a cursor and the like on a screen displayed by a navigation system and the like and movement operation on the hierarchy of a menu, a folder and the like on a screen displayed by a navigation system, an audio system and the like.

The abovementioned operation instruction is an example, and the operation device according to the present invention can be set to accept any operation instruction for any component as long as it is a component installed in a vehicle.

Supplementary Notes

The whole or part of the example embodiments disclosed above can be described as the following supplementary notes. Below, the outline of an operation device according to the present invention will be described. However, the present invention is not limited to the following configurations.

Supplementary Note 1

An operation device comprising a touch-sensitive operation surface placed in a vehicle and a detecting unit configured to detect touch operation by an operator on the touch-sensitive operation surface, wherein:
  a guide part and a planar operation part are formed on the touch-sensitive operation surface, the guide part having a convex shape or a concave shape, the planar operation part being an operation location having a planar shape located around the guide part; and
  the detecting unit is configured to detect slide operation on the guide part from the planar operation part, and accept later operation on a predetermined operation location as an operation instruction set in accordance with a status of the slide operation on the guide part.

Supplementary Note 2

The operation device according to Supplementary Note 1, wherein
  the detecting unit is configured to detect a status of slide operation of straddling the guide part along a widthwise direction, and accept later operation on a predetermined operation location as an operation instruction set in accordance with the status of the slide operation of straddling the guide part.

Supplementary Note 3

The operation device according to Supplementary Note 2, wherein
  the detecting unit is configured to detect a number of straddles representing a number of the guide parts straddled through the slide operation, and accept later operation on the planar operation part as an operation instruction set in accordance with the number of straddles.

Supplementary Note 4

The operation device according to Supplementary Note 3, wherein
  the detecting unit is configured to detect the number of straddles, and accept later operation on the planar operation part as an operation instruction set in accordance with the operation location of the operated planar operation part and the number of straddles.

Supplementary Note 5

The operation device according to Supplementary Note 4, wherein:
  a plurality of specific operation locations corresponding to respective values of the number of straddles are formed at the planar operation part on the touch-sensitive operation surface; and
  the detecting unit is configured to detect the number of straddles, and accept later operation on the specific operation location corresponding to the detected number of straddles.

Supplementary Note 6

The operation device according to Supplementary Note 5, wherein
  the detecting unit is configured to accept respective operations on the plurality of specific operation locations formed so as to correspond to the respective values of the number of straddles, as different operation instructions for an identical component of the vehicle.

Supplementary Note 7

The operation device according to any of Supplementary Notes 3 to 6, wherein:
  two guide parts are formed in parallel on the touch-sensitive operation surface, a first specific operation location is formed at the planar operation part located between the two guide parts, and a second specific operation location is formed at the planar operation part located on a side of the two guide parts; and
  the detecting unit is configured to accept operation on the first specific operation location after slide operation of straddling one of the guide parts, and accept operation on the second specific operation location after slide operation of straddling the two guide parts.

Supplementary Note 8

An operation accepting method by an operation device comprising a touch-sensitive operation surface placed in a vehicle and a detecting unit configured to detect touch operation by an operator on the touch-sensitive operation surface, wherein a guide part and a planar operation part are formed on the touch-sensitive operation surface, the guide part having a convex shape or a concave shape, the planar operation part being an operation location having a planar shape located around the guide part, the operation accepting method comprising by the detecting unit, detecting slide operation on the guide part from the planar operation part, and accepting later operation on a predetermined operation location as an operation instruction set in accordance with a status of the slide operation on the guide part.

Supplementary Note 9

The operation accepting method according to Supplementary Note 8, comprising by the detecting unit, detecting a status of slide operation of straddling the guide part along a widthwise direction, and accepting later operation on a predetermined operation location as an operation instruction set in accordance with the status of the slide operation of straddling the guide part.

Supplementary Note 10

The operation device according to Supplementary Note 9, comprising by the detecting unit, detecting a number of straddles representing a number of the guide parts straddled through the slide operation, and accepting later operation on the planar operation part as an operation instruction set in accordance with the number of straddles.

Although the present invention has been described above with reference to the example embodiments, the present invention is not limited to the above example embodiments. The configurations and details of the present invention can be changed in various manners that can be understood by one skilled in the art within the scope of the present invention.

DESCRIPTION OF REFERENCE NUMERALS 10, 50, 60 operation panel
11, 12, 13, 51, 61 guide part
20 detection device
30 control device
R1, R11, R21, R31 first operation region
R2, R12, R22, R32 second operation region
R3, R13, R23, R33 third operation region

The invention claimed is:

1. An operation device comprising:
a touch-sensitive operation surface placed in a vehicle; and
a detecting unit configured to detect touch operation by an operator on the touch-sensitive operation surface, wherein a guide part and a planar operation part are formed on the touch-sensitive operation surface, the guide part having a convex shape or a concave shape, the planar operation part being an operation location having a planar shape located around the guide part, the detecting unit is configured to detect a status of slide operation of straddling the guide part from the planar operation part, and accept later operation on a predetermined operation location as an operation instruction set in accordance with the status of the slide operation of straddling the guide part, and wherein the touch-sensitive operation surface of both the guide part and the planar operation part are required for the predetermined operation location.

2. The operation device according to claim 1, wherein the detecting unit is configured to detect a number of straddles representing a number of the guide parts straddled through the slide operation, and accept later operation on the planar operation part as an operation instruction set in accordance with the number of straddles.

3. The operation device according to claim 2, wherein the detecting unit is configured to detect the number of straddles, and accept later operation on the planar operation part as an operation instruction set in accordance with the operation location of the operated planar operation part and the number of straddles.

4. The operation device according to claim 3, wherein:
a plurality of specific operation locations corresponding to respective values of the number of straddles are formed at the planar operation part on the touch-sensitive operation surface; and the detecting unit is configured to detect the number of straddles, and accept later operation on the specific operation location corresponding to the detected number of straddles.

5. The operation device according to claim 4, wherein the detecting unit is configured to accept respective operations on the plurality of specific operation locations formed so as to correspond to the respective values of the number of straddles, as different operation instructions for an identical component of the vehicle.

6. The operation device according to claim 2, wherein:
two guide parts are formed in parallel on the touch-sensitive operation surface, a first specific operation location is formed at the planar operation part located between the two guide parts, and a second specific operation location is formed at the planar operation part located on a side of the two guide parts; and the detecting unit is configured to accept operation on the first specific operation location after slide operation of straddling one of the guide parts, and accept operation on the second specific operation location after slide operation of straddling the two guide parts.

* * * * *